US006460378B1

(12) United States Patent
Dong et al.

(10) Patent No.: US 6,460,378 B1
(45) Date of Patent: Oct. 8, 2002

(54) COLLAPSING A MULTITUBE ASSEMBLY AND SUBSEQUENT OPTICAL FIBER DRAWING IN THE SAME FURNACE

(76) Inventors: Xiaoyuan Dong, 8515 River Walk Landing, Suwanee, GA (US) 30024; Siu-Ping Hong, 5635 Timson La., Alpharetta, GA (US) 30022; Thomas John Miller, 3735 Banyon La., Alpharetta, GA (US) 30022; Don H Smith, 1910 Oak Grove Rd., Atlanta, GA (US) 30345

( * ) Notice: Subject to any disclaimer, the term of this patent is extended or adjusted under 35 U.S.C. 154(b) by 0 days.

(21) Appl. No.: 09/515,227

(22) Filed: Feb. 29, 2000

(51) Int. Cl.[7] .......................................... C03B 31/027
(52) U.S. Cl. .......................................... 65/412; 65/435
(58) Field of Search ..................... 65/412, 435

(56) References Cited

U.S. PATENT DOCUMENTS

| | | | |
|---|---|---|---|
| 4,217,027 A | 8/1980 | MacChesney | 350/96.3 |
| 4,414,164 A | * 11/1983 | Roba et al. | 264/1.23 |
| 4,547,644 A | 10/1985 | Bair | 219/10.49 R |
| 4,596,589 A | * 6/1986 | Perry | 65/412 |
| 4,775,401 A | 10/1988 | Fleming | 65/3.11 |
| 4,820,322 A | 4/1989 | Baumgart | 65/3.11 |
| 4,975,102 A | * 12/1990 | Edahiro et al. | 385/127 |
| 5,242,476 A | * 9/1993 | Bartel et al. | 65/399 |
| 5,702,497 A | * 12/1997 | Oh et al. | 65/412 |

FOREIGN PATENT DOCUMENTS

| | | | | |
|---|---|---|---|---|
| DE | 4005729 | | 8/1991 | |
| EP | 259877 | * | 3/1988 | 65/412 |
| GB | 2208114 | * | 3/1989 | 65/412 |
| JP | 51-81143 | * | 7/1976 | 65/412 |
| JP | 51081143 | | 7/1976 | |
| JP | 57-92536 | * | 6/1982 | 65/412 |

OTHER PUBLICATIONS

European Patent Abstract of DE 4005729, Aug. 1991.*

* cited by examiner

*Primary Examiner*—John Hoffmann
(74) *Attorney, Agent, or Firm*—John M. Harman

(57) ABSTRACT

Embodiments of the invention include a method and apparatus for making a multiple overclad optical fiber preform. The method includes positioning a first overclad tube around a preform core rod, positioning at least one second overclad tube around the first overclad tube, and collectively heating the preform core and the overclad tubes under pressure to collapse the overclad tubes onto the preform core rod thus producing a multiple overclad optical fiber preform. The apparatus includes a preform core rod, a first overclad tube surrounding the preform core rod, and at least one second overclad tube surrounding the first overclad tube. A quartz disc with or without one or more quartz spacers is used for supporting the preform core rod and the first overclad tube within the additional overclad tubes.

6 Claims, 4 Drawing Sheets

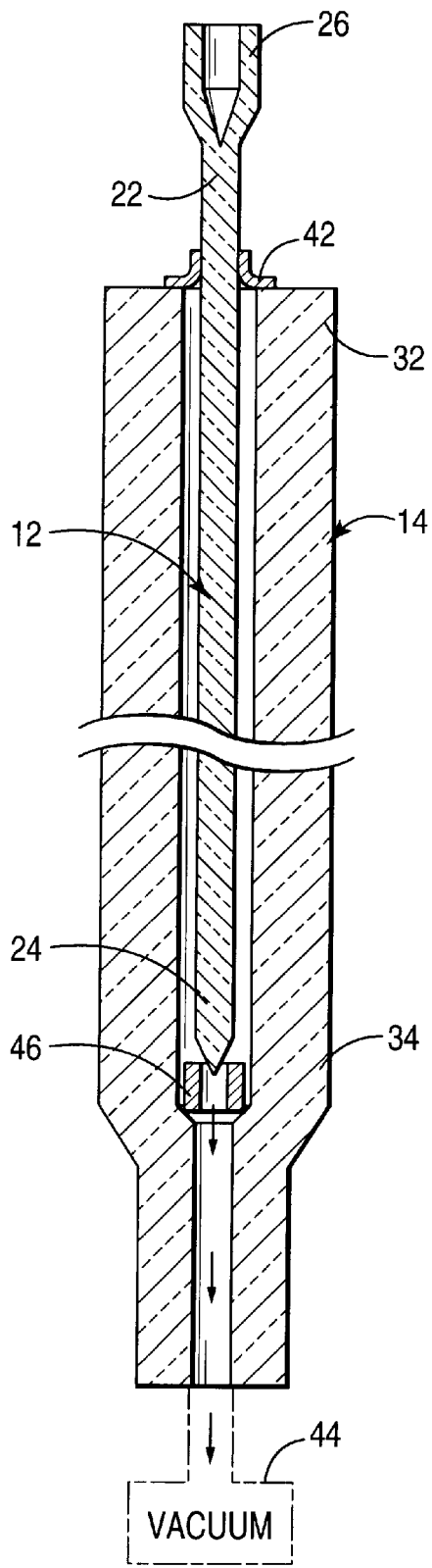 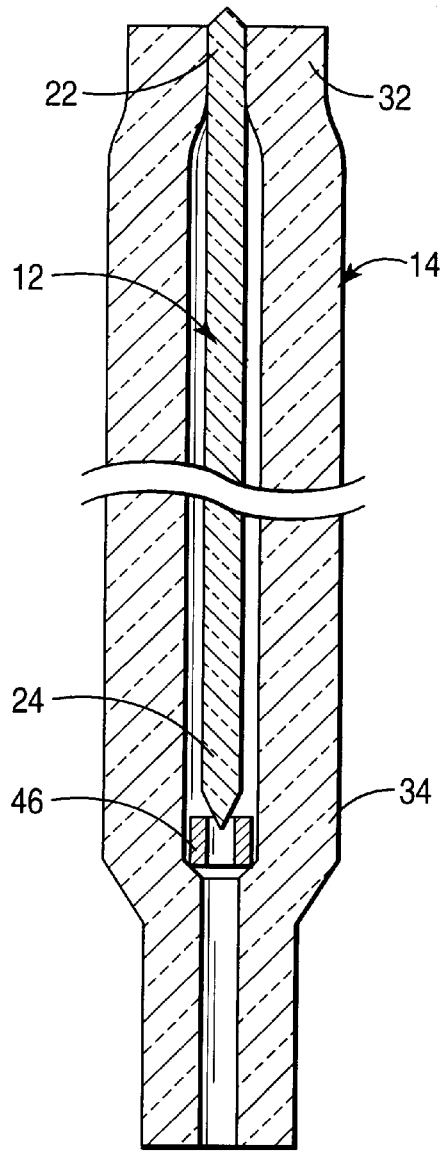
FIG 2a  FIG 2b

COLLAPSING A MULTITUBE ASSEMBLY AND SUBSEQUENT OPTICAL FIBER DRAWING IN THE SAME FURNACE

BACKGROUND OF THE INVENTION

1. Field of the Invention

The invention relates to methods and apparatus for overcladding a glass rod. More particularly, the invention relates to Rod-In-Tube (RIT) methods and apparatus for overcladding a glass rod.

2. Description of the Related Art

Optical fibers typically are fabricated by heating and drawing a portion of an optical preform comprising a refractive core surrounded by a protective glass cladding. Conventionally, several processes exist for fabricating preforms, including a modified chemical vapor deposition (MCVD) process. See, e.g., U.S. Pat. No. 4,217,027, which is issued to MacChesney et al. on Aug. 12, 1980 and co-owned with this application. Another conventional process is the vapor axial deposition (VAD) process.

In the MCVD process, precursor gases such as $SiCl_4$ and $GeCl_4$ pass through a rotating substrate tube of silica glass. A torch heats the tube from the outside as the precursor gases pass therethrough, causing deposition of submicron-sized glass particles on the inside surface of the tube. Movement of the torch along the longitudinal axis of the tube in a plurality of passes builds up layer upon layer of glass to provide a preform tube. Once a suitable number of layers have been deposited, the preform tube is heated to cause it to collapse into a solid rod typically referred to as the preform, the preform rod, the core rod or the preform core rod.

The preform core rod then is inserted into a glass overclad tube, which is collapsed onto the preform core rod using heat and a pressure gradient present about the overclad tube. Such process typically is referred to as the Rod-In-Tube (RIT) process. See, e.g., U.S. Pat. No. 4,820,322, which is co-owned with this application, and hereby is incorporated by reference herein. Depending on the desired final size of the optical preform, steps of the RIT process are repeated. More specifically, to produce optical fiber preforms having larger diameters, e.g., 63 millimeters (mm) or larger, the RIT process is performed twice. That is, a first overclad tube is collapsed onto the preform core rod using a conventional RIT process and then a second overclad tube is collapsed onto the existing overclad preform rod using a second RIT process. The resulting doubleclad optical fiber preform is desirably larger than preforms made with a more conventional, single RIT overcladding process. Typically, preforms having larger diameters tend to yield more optical fiber drawn therefrom than smaller preforms. The increased yield thus improves productivity of preform manufacturing processes, as the number of preforms used per length of optical fiber is reduced, as are the associated setup and installation times.

Other processing variations exist for manufacturing optical fiber preforms. For example, in conventional RIT processes, the collapse of the overclad tube onto the preform core rod typically is performed while the overclad tube and the preform core rod are mounted in a vertical lathe. Alternatively, the collapse of the overclad tube on the preform core rod is performed in a draw tower furnace, which also is used to draw optical fiber from the resulting optical fiber preform. Such collapse is accomplished by inserting the preform core rod into an overclad tube and then moving the combined preform core rod and overclad tube coaxially through the draw tower furnace, which causes collapse of the overclad tube onto the preform core rod prior to the drawing of the fiber. Such technique often is referred to as Overclad During Draw (ODD).

Although existing RIT and ODD processes and devices save process time (and money), further efficiencies in MCVD optical fiber manufacturing processes are desired. For example, it would be desirable to have available methods and apparatus for manufacturing larger overclad preforms without involving additional RIT process overcladding steps. Similarly, for example, it would be desirable to benefit from the reduced heat treatment associated with conventional ODD processes.

SUMMARY OF THE INVENTION

The invention is embodied in a method and apparatus for making a multiple overclad optical fiber preform and making optical fiber therefrom. Embodiments of the invention provide a method for making a multiple overclad optical fiber preform, which includes the steps of positioning a first overclad tube around a preform core rod, positioning at least one second overclad tube around the first overclad tube, and collectively heating the preform core, the first overclad tube and the one or more second overclad tubes under pressure to collapse the overclad tubes onto the preform core rod thus producing a multiple-clad optical fiber preform. Heating occurs either in a draw tower furnace, e.g., as part of an Overclad During Draw (ODD) process, or, alternatively, by a separate heating source prior to introducing the preform into the draw tower, e.g., as in a conventional Rod-In-Tube (RIT) process. The preform core rod is positioned into and substantially coaxial with the first overclad tube, e.g., by inserting the distal end of the preform core rod into the proximal end of the first overclad tube and sealing the relative positions thereof. Similarly, the first overclad tube is positioned into and substantially coaxial with the one or more second overclad tubes, e.g., by inserting the distal end of the first overclad tube into the proximal end of the second overclad tubes and sealing their respective positions.

According to embodiments of the invention, a method for making optical fiber from the multiple overclad preform further includes the step of drawing optical fiber as portions of the preform are being heated in the draw tower furnace, as per ODD processes. Alternatively, the multiple overclad preform is heated by a heating source external to the draw tower, e.g., as in conventional RIT processes. The resulting multiple overclad preform then is moved to the draw tower and optical fiber subsequently is drawn therefrom.

According to embodiments of the invention, an apparatus for making a multiple overclad optical fiber preform includes a preform core rod, a first overclad tube surrounding the preform core rod, and at least one second overclad tube surrounding the first overclad tube. Alternatively, the apparatus also includes a quartz disc with or without one or more quartz spacers positioned within at least one of the overclad tubes for supporting the preform core rod and the first overclad tube within the one or more second overclad tubes. The preform rod and the first overclad tube are dimensioned such that the outer diameter of the preform rod is within the range from approximately 0.50 mm to approximately 1.75 mm from the inner diameter of the first overclad tube. Also, the first overclad tube is dimensioned such that its outer diameter is within the range from approximately 0.50 mm to approximately 1.75 mm from the inner diameter of the second overclad tubes.

According to embodiments of the invention, an apparatus for manufacturing a multiple overclad optical fiber preform includes a support for operably positioning an apparatus having a preform core rod and a plurality of overclad tubes, a heat source for heating the apparatus, and a vacuum source for establishing a pressure gradient across the exterior and the interior of the apparatus. Heating the apparatus with the established pressure gradient causes the overclad tubes to collapse onto the preform core rod, thus forming the multiple overclad optical fiber preform. Heating the apparatus occurs in the fiber draw tower, e.g., similar to ODD processes, or, alternatively, prior to the multiple overclad preform being positioned in the draw tower, e.g., similar to conventional RIT processes.

BRIEF DESCRIPTION OF THE DRAWINGS

In the drawings:

FIG. 2a is a cross-sectional view of an overclad tube positioned around a preform core rod prior to collapsing the overclad tube around the preform core rod to make an overclad preform according to a conventional overclad during draw (ODD) process;

FIG. 2b is a cross-sectional view of an overclad tube positioned around a preform core rod prior to collapsing the overclad tube around the preform core rod to make an overclad preform according to a conventional overclad during draw (ODD) process, showing the preform core rod sealed within overclad tube;

DETAILED DESCRIPTION

Figure 1A:
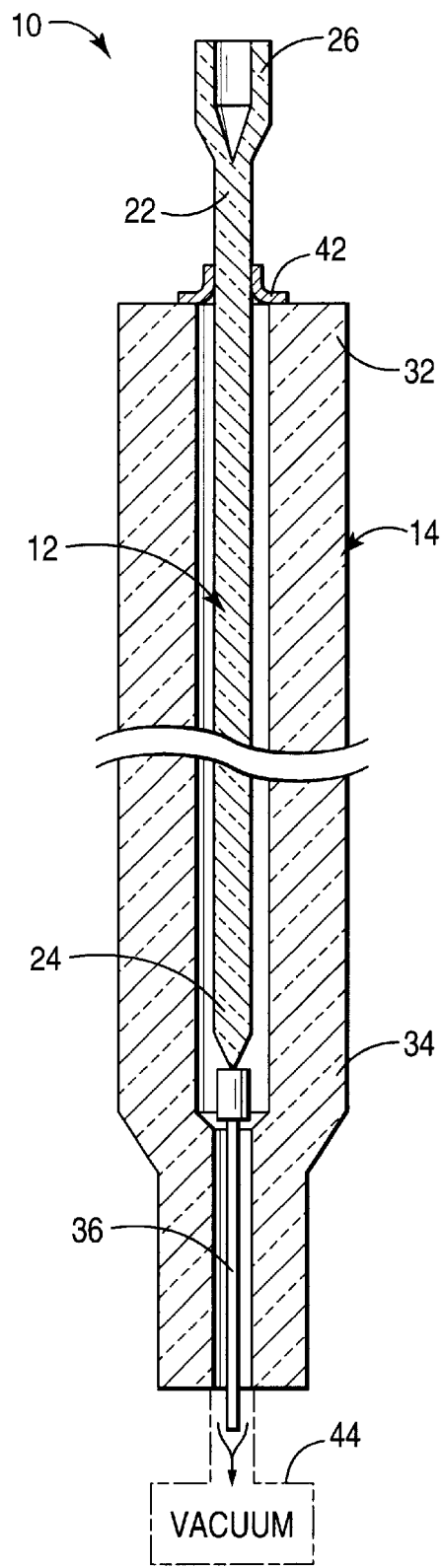
FIG. 1a is a cross-sectional view of an overclad tube positioned around a preform core rod prior to collapsing the overclad tube around the preform core rod to make an overclad preform according to a conventional Rod-In-Tube (RIT) process.

In the following description similar components are referred to by the same reference numeral in order to simplify the sequential aspect of the drawings and to enhance the understanding of the invention through the description of the drawings. Also, although specific features, configurations and arrangements are discussed hereinbelow, it should be understood that such is done for illustrative purposes only. A person skilled in the relevant art will recognize that other steps, configurations and arrangements are useful without departing from the spirit and scope of the invention.

Figure 1B:
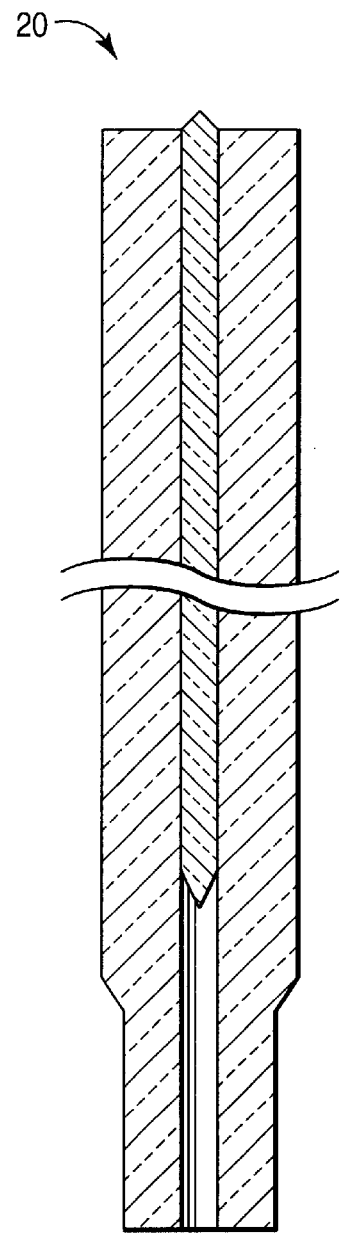
FIG. 1b is a cross-sectional view of an overclad preform made by a conventional Rod-In-Tube (RIT) process.

Referring now to FIGS. 1a–b, illustrated is an apparatus 10 (FIG. 1a), comprising a preform core rod 12 and an overclad tube 14, used to make an overclad preform 20 (FIG. 1b) according to a conventional Rod-In-Tube (RIT) process. In FIG. 1a, the preform core rod 12 is positioned vertically within the overclad tube 14 prior to the collapse of the overclad tube 14 around the preform core rod 12. FIG. 1b illustrates the overclad preform after the overclad tube 14 has been collapsed around the preform core rod 12.

The preform core rod 12 is made by any suitable process, including conventional processes such as modified chemical vapor deposition (MCVD) or vapor axial deposition (VAD). The preform core rod 12 has a proximal end 22 and a distal end 24, and often is made with a handle 26 at the proximal end 22. The handle 26 facilitates maneuvering the preform core rod 12, e.g., as the distal end 24 of the rod 12 is inserted into the overclad tube 14.

The overclad tube 14 has a first or proximal end 32 into which the preform core rod 12 is inserted and a second or distal end 34 configured for mounting into a chuck or other appropriate holding device. An adjustable support rod 36 is positioned within the second end 34 of the overclad tube 14 to provide support for the preform core rod 12.

Once the preform core rod 12 is positioned as desired within the overclad tube 14, the proximal end 22 of the preform core rod 12 is sealed off, e.g., by a seal 42 or other appropriate means. A pressure gradient then is established across the region between the preform core rod 12 and the overclad tube 14, e.g., by operably coupling a vacuum source 44 to the distal end of the overclad tube 14. The overclad tube 14 is heated while the pressure gradient is maintained across the region between the preform core rod 12 and the overclad tube 14, thus collapsing the overclad tube 14 around the preform core rod 12, e.g., in accordance with a conventional Rod-In-Tube (RIT) process. The resulting overclad preform 20 is shown in FIG. 1b.

As discussed previously herein, at least one more subsequent overcladding process is performed if the final size of the optical fiber is desired to be larger. That is, once the first overclad tube is collapsed onto,the preform core rod using a first conventional RIT process, a second overclad tube is collapsed onto the existing overclad preform 20 using a second conventional PIT process. The resulting double-clad or double overclad optical fiber preform is desirably larger than preforms made with a more conventional, single RIT overcladding process. For example, overclad optical fiber preforms that typically have an outer diameter, e.g., of approximately 50 millimeters (mm), using a single RIT process are made to have an outer diameter, e.g., of approximately 80 mm, using a second RIT process.

Also, as discussed previously herein,,other variations of conventional RIT processes include collapsing the overclad tube 14 on the preform core rod 12 in the furnace of the draw tower used for drawing optical fiber from the resulting overclad preform 20. Such process often is referred to as Overclad During Draw (ODD), and is shown generally in FIGS. 2a–b and discussed briefly hereinbelow.

According to some ODD processes, the preform core rod 12 is positioned, e.g., vertically, within the overclad tube 14. A quartz disc 46 or other supporting or spacer means typically occupies the second or distal end 34 of the overclad tube 14. The proximal end 22 of the preform core rod 12 is sealed at the first or proximal end 32 of the overclad tube 14, e.g., by the seal 42 or other appropriate sealing means.

The proximal end 22 of the preform core rod 12 and the proximal end 32 of the overclad tube 14 then are heated together to form a sealed, unitary structure. FIG. 2b shows one arrangement of the resulting overclad tube 14 having the preform core rod 12 sealingly positioned therein.

The combined overclad tube 14 and preform core rod 12 then is moved through a draw tower furnace (not shown), beginning with the sealed proximal ends 22, 32. In this manner, the overclad tube 14 gradually but completely collapses onto the preform core rod 12 prior to optical fiber being drawn from the resulting overclad preform. As discussed previously herein, the ODD process is advantageous, e.g., in that separate heat treatment needed for collapsing the overclad tube on the preform outside of the furnace (e.g., on a lathe) is not needed because the draw tower furnace provides such heat. Also not needed is some of the separate set-up and tube preparation processing associated with separate heat treatment steps.

Embodiments of the invention are based on the advantageous realization that the overcladding process times are improved and other efficiencies are gained by manufacturing dual, double or multiple overclad optical fiber preforms using an inventive overclad during draw (ODD) process. As will be discussed in greater detail hereinbelow, other advantages include improved overclad layer structure and more efficient use of overclad tube materials.

Figure 3A:
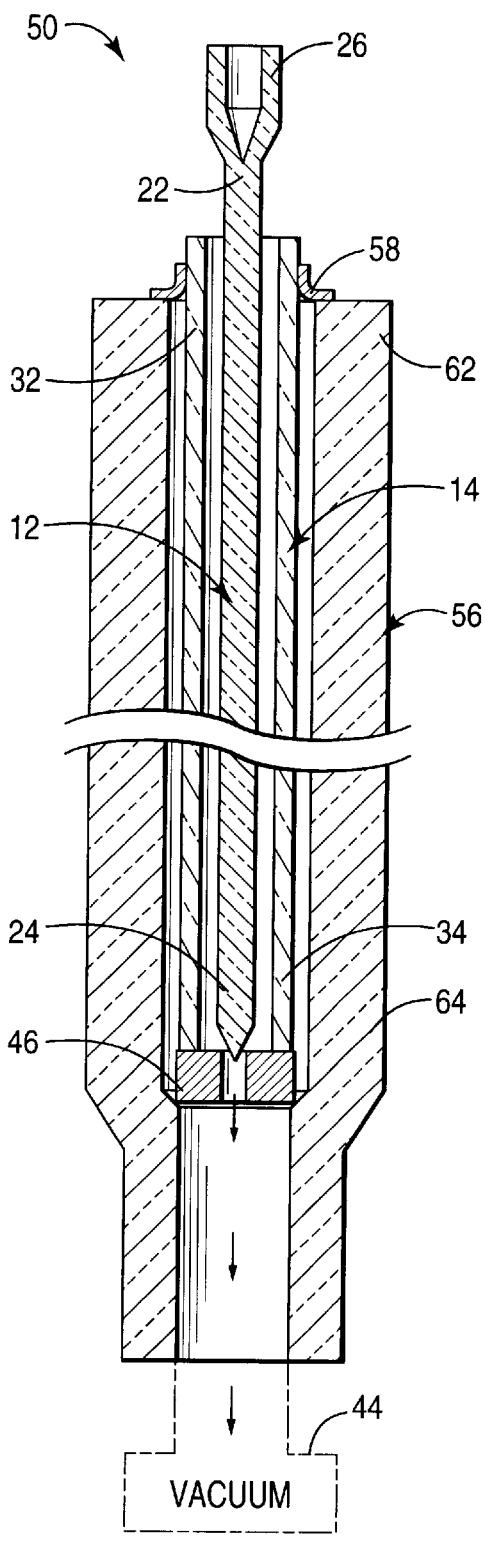
FIG. 3a is a cross-sectional view of inner and outer overclad tubes positioned around a preform core rod prior to collapsing the overclad tubes around the preform core rod to make a multiple overclad preform according to embodiments of the invention.
Figure 3B:
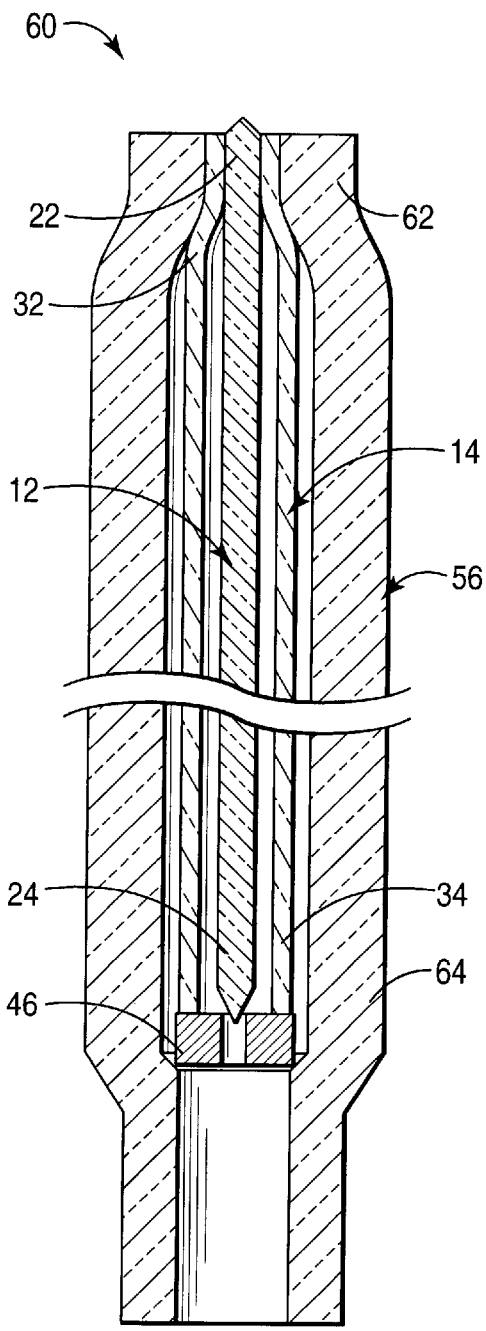
FIG. 3b is a cross-sectional view of inner and outer overclad tubes positioned around a preform core rod prior to collapsing the overclad tubes around the preform core rod to make a multiple overclad preform according to embodiments of the invention, showing the preform core rod and the overclad tubes sealed together.

Referring now to FIGS. 3*a*–*b*, shown are an apparatus 50 (FIG. 3*a*) for making a dual overclad optical fiber preform according to embodiments of the invention and the resulting double overclad tube 60 (FIG. 3*b*) with the preform core rod 12 sealingly positioned therein. Also, referring to FIG. 4, with continuing reference to FIGS. 3*a*–*b*, shown is a simplified block diagram of a method 70 for making dual overclad optical fiber preforms and for drawing optical fiber therefrom.

Figure 4:
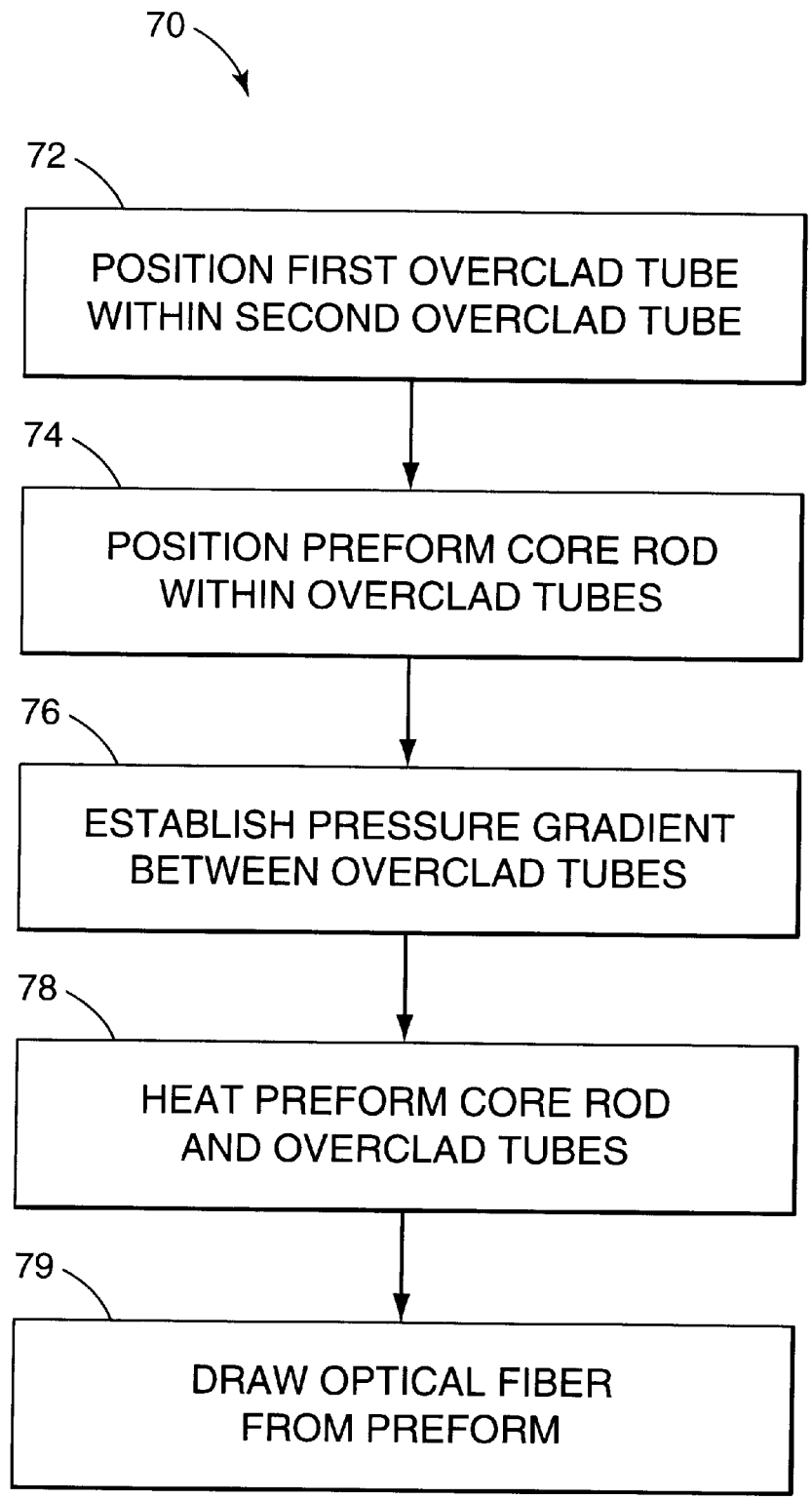
FIG. 4 is a simplified block diagram of a method for making multiple overclad optical fiber preforms and making optical fiber therefrom.

It should be understood that, although dual overclad embodiments are shown in FIGS. 3–4 and described hereinbelow, embodiments of the invention include multiple overclad arrangements. Moreover, it is within the scope of alternative embodiments of the invention to modify the arrangement shown in FIGS. 3*a*–*b* for multiple overclad arrangements and the method shown in FIG. 4 for multiple overclad manufacturing methods.

The inventive apparatus 50 shown in FIG. 3*a* includes a preform core rod 12, a first overclad tube 14 and a second overclad tube 56. The preform core rod 12 has a proximal end 22 with a handle 26 and a distal end 24. Similarly, the first overclad tube 14 has a proximal end 32 and a distal end 34, and the second overclad tube 56 likewise has a proximal end 62 and a distal end 64. For multiple overclad embodiments of the invention, additional second overclad tubes are included. However, for purposes of discussion herein, only the first and second overclad tubes are shown in the Figs.

One step 72 of the method 70 is to position the preform core rod 12 and the first overclad tube 14 within the second overclad tube 56, e.g., by inserting the distal ends 24, 34 of the preform core rod 12 and the first overclad tube 14, respectively, into the proximal end 62 of the second overclad tube 56. The first overclad tube 14 typically will be shorter in length than the second overclad tube 56, although the final overall useful size of the preform does not differ disadvantageously from preforms made according to conventional techniques.

Another step 74 of the method 70 is to position the preform core rod 12 within the overclad tubes, e.g., by inserting the distal end 24 of the preform core rod 12 into the proximal end 32 of the first overclad tube 14. The handle 26 facilitates insertion of the preform core rod 12 into the first overclad tube 14. Typically, the preform core rod 12 and the first overclad tube 14 are dimensioned such that the outer diameter of the preform core rod 12 is within the range from approximately 0.50 millimeters (mm) to approximately 1.75 mm from the inner diameter of the first overclad tube 14. Also, the preform core rod 12 and first overclad tube 14 are configured in such a way that, when the preform core rod 12 is positioned within the first overclad tube 14, the two are substantially coaxial with respect to one another.

A support 46 such as a quartz disc or suitable spacer means supports both the preform core rod 12 and the first overclad tube 14, as shown. Support for shorter preform core rods is achieved, e.g., using one or more quartz spacers in addition to the quartz disc 46. Also, it is possible for the first overclad tube 14 to be configured such that the quartz disc 46 is positioned therein for supporting the preform core rod 12 therein. Other supports including support rods are suitable for use in the inventive embodiments shown and described herein.

The second overclad tube 56 is configured, e.g., in such a way that the quartz disc 46 or other spacer means is positioned therein so as to supportably position the preform core rod 12 and the first overclad tube 14 with respect to one another. For example, the distal end 64 of the second overclad tube 56 is configured for mounting into a chuck or other appropriate holding device, and thus has a reduced inner diameter, which is dimensioned to position the quartz disc 46 therein. Also, the first and second overclad tubes are dimensioned such that the outer diameter of the first overclad tube 14 is within the range from approximately 0.50 mm to approximately 1.75 mm from the inner diameter of the second overclad tube 56.

Typically, the preform core rod 12 and the overclad tubes are configured in such a way that, when positioned as shown, the three are substantially coaxial with respect to one another. A second seal or seal ring 58, or other suitable sealing means, is used to maintain the relative position of the first overclad tube 14 with respect to the second overclad tube 56, e.g., by sealing the proximal end 32 of the first overclad tube 14 to the proximal end 62 of the second overclad tube 56. Thus, according to embodiments of the invention, the relative positions of the preform core rod 12, the first overclad tube 14 and the second overclad tube 56 all are maintained with respect to one another and have been sealed off at their proximal ends.

The proximal ends of the preform core rod 12, the first overclad tube 14 and the second overclad tube 56 then are heated or otherwise formed together in a manner that results in a sealed, unitary structure. The resulting structure is shown, e.g., in FIG. 3*b* as an apparatus 60.

Another step 76 in the method 70 is to establish a pressure gradient across the sealed area, e.g., using a vacuum source operably connected across the distal ends of the first overclad tube 14 and the second overclad tube 56. The established pressure gradient is such that the pressure outside the second overclad tube 56 is substantially greater than the pressure inside the second overclad tube 56, and the pressure outside the first overclad tube 14 is substantially greater than the pressure inside the first overclad tube 14. For example, the pressure gradient is within the range from approximately 0.25 to approximately 0.50 atmospheric pressure.

Another step 78 in the method 70 is to heat the apparatus 60 comprising the preform core rod 12 and the overclad tubes, e.g., within the range from approximately 1600–1700° C. According to an embodiment of the invention, the heating step 78 applies heat, e.g., to successive axial portions of the apparatus 60, i.e., along the length of the apparatus 60 from the proximal ends to the distal ends. Alternatively, the heating step 78 applies heat simultaneously to most if not all portions of the combined preform and dual overclad tube apparatus 60. Such simultaneous heating generally is indicative of heating in conventional RIT processes.

The heating step 78 causes the overclad tubes to collapse onto the preform core rod 12 (FIG. 3*b* generally illustrates the apparatus 60 prior to such collapsing). Thus, according to embodiments of the invention, a dual or multiple clad optical fiber preform is formed using a single rather than double RIT process. That is, one heating and collapsing step is used rather than conventional methods that typically require two separate heating and collapsing steps, i.e., a first heating and collapsing step and then a subsequent, second heating and collapsing steps.

Moreover, according to alternative embodiments of the invention, the heat source used to heat and collapse the dual overclad apparatus 60 is a draw tower furnace. That is, the inventive apparatus 60 is moved operably through a draw tower furnace, e.g., as part of an overclad during draw (ODD) process. In this manner, the first and second overclad tubes 14, 56 collapse on the preform core rod 12 using a single heat source and a single heating step. The resulting double-clad optical fiber preform 60 then is used to draw optical fiber therefrom, e.g., in a conventional manner.

Multiple overclad optical fiber preforms made according to embodiments of the invention include a number of advantageous features over conventionally made optical fiber preforms. For example, as mentioned briefly hereinabove, embodiments of the invention typically have relatively large preforms, which generally yield more optical fiber per preform than smaller preforms. Also, larger preforms reduce the overall number of preforms needed per unit of fiber length produced, which, in turn, reduces the overall amount of preform set-up and processing time.

Moreover, embodiments of the invention significantly reduce set-up and processing time through the elimination of the steps of the first overcladding process. That is, whereas conventional processes require, e.g., two or more separate overcladding processes, embodiments of the invention provide a dual or multiple overclad optical fiber preform using a single overcladding process. Thus, the set-up, heating, cooling and other associated process steps required for the additional overcladding, and the associated time thereof, are eliminated.

Also, in addition to the advantages just discussed, preforms made according to embodiments of the invention manage to improve on existing benefits of conventional processes of making preforms. For example, compared to conventionally-made preforms, preforms made according to embodiments of the invention tend to have fewer interface breaks and tend to have less curl. Also, compared to conventionally-made preforms, preforms made according to embodiments of the invention tend to have better eccentricity, which refers to the consistency of the diameters of the preform core rod and the overclad tubes moving axially down the optical fiber preform.

As shown in FIG. 4, the method 70 includes the step 79 of drawing optical fiber from the multiple overclad optical fiber preform. The drawing step 79 is performed, e.g., in a conventional manner. That is, the drawing step is performed once the inventive optical fiber preform has been manufactured., Alternatively, in an ODD-type process, the drawing step 79 is performed as the overclad optical fiber preform is being formed, i.e., as the overclad tubes are being collapsed onto the preform core rod 12 within the draw tower furnace.

It will be apparent to those skilled in the art that many changes and substitutions can be made to the embodiments of the methods and apparatus for overcladding optical fiber preform rods herein described without departing from the spirit and scope of the invention as defined by the appended claims and their full scope of equivalents. For example, although embodiments of the invention typically apply a single ODD process to collapse both the first and second overclad tubes together, it should be understood that, alternatively, it is possible to use a conventional RIT process to collapse the first overclad tube and then use an ODD process to collapse the additional overclad tubes around the existing overclad preform rod. That is, the first overcladding is performed outside the fiber drawing heat source using conventional RIT techniques and then the additional overcladding is performed (at the fiber drawing furnace) using ODD techniques. In this manner, a multiple ODD process according to an alternative embodiment of the invention is performed.

What is claimed is:

1. A method of making an optical fiber, comprising the steps of:

providing a preform core rod;

positioning a first overclad tube around the preform core rod;

positioning at least one second overclad tube around the first overclad tube;

establishing a pressure gradient across the exterior and the interior of at least the second overclad tube, wherein the pressure outside the second overclad tube is greater than the pressure inside the second overclad tube;

heating the preform core rod, the first overclad tube and the at least one second overclad tube wherein the first overclad tube collapses onto the preform core rod and the second overclad tube collapses on the first overclad tube to form a multiple overclad optical fiber preform; and drawing the optical fiber from the overclad optical fiber preform wherein the heating step and the drawing step are performed using the same heat source.

2. The method as recited in claim 1, further comprising the step of establishing a pressure gradient between the outside and the inside of the first overclad tube, wherein pressure outside the first overclad tube is greater than the pressure inside the first overclad tube.

3. The method as recited in claim 1, further comprising the step of establishing a pressure gradient between the outside and the inside of the second overclad tube, wherein pressure outside the second overclad tube is greater than the pressure inside the second overclad tube.

4. The method as recited in claim 1, further comprising the step of sealing the preform core rod to the first overclad tube in such a way that a pressure gradient is formable between the outside and the inside of the first overclad tube.

5. The method as recited in claim 1, wherein the first overclad tube positioning step further comprises positioning the preform rod within the first overclad tube in such a way that the preform rod and the first overclad tube are substantially coaxial.

6. The method as recited in claim 1, wherein the second overclad tube positioning step further comprises positioning the first overclad tube within the second overclad tube in such a way that the first and second overclad tubes are substantially coaxial.

* * * * *